US011807062B2

(12) United States Patent
Lazarevski et al.

(10) Patent No.: US 11,807,062 B2
(45) Date of Patent: Nov. 7, 2023

(54) COLLABORATIVE RELATIONSHIP BETWEEN A VEHICLE AND A UAV (71) Applicant: Ford Global Technologies, LLC, Dearborn, MI (US)

(72) Inventors: Peter Lazarevski, Dearborn, MI (US); Austin Thind, Whistler (CA); James Carthew, Oakland, CA (US); Timothy Panagis, Ypsilanti, MI (US); Nelson Brock, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 16/694,374

(22) Filed: Nov. 25, 2019

(65) Prior Publication Data
US 2021/0155069 A1 May 27, 2021

(51) Int. Cl.
*B60G 17/0165* (2006.01)
*G08G 5/00* (2006.01)
*B64C 39/02* (2023.01)
*G06T 19/00* (2011.01)
*B64U 101/30* (2023.01)

(52) U.S. Cl.
CPC ........ *B60G 17/0165* (2013.01); *B64C 39/024* (2013.01); *G06T 19/006* (2013.01); *G08G 5/0086* (2013.01); *B64U 2101/30* (2023.01)

(58) Field of Classification Search
CPC .................................................. B60G 17/0165
See application file for complete search history.

(56) References Cited

U.S. PATENT DOCUMENTS

| | | | | |
|---|---|---|---|---|
| 8,994,558 B2* | 3/2015 | Kim | ........................ | G08G 1/166 340/905 |
| 9,409,644 B2 | 8/2016 | Stanek et al. | | |
| 10,165,722 B2* | 1/2019 | Ackerman | ............. | G05D 1/024 |
| 11,180,134 B2* | 11/2021 | Yu | ........................ | B60W 30/025 |
| 11,210,537 B2* | 12/2021 | Koivisto | ................ | G06V 10/46 |

(Continued)

FOREIGN PATENT DOCUMENTS

| | | |
|---|---|---|
| DE | 102011106170 A1 | 2/2012 |
| DE | 102017009497 A1 | 4/2018 |

(Continued)

*Primary Examiner* — Jean Paul Cass
(74) *Attorney, Agent, or Firm* — Brandon Hicks; Eversheds Sutherland (US) LLP (57) ABSTRACT Exemplary embodiments described in this disclosure are generally directed to a collaborative relationship between a vehicle and a UAV. In one exemplary implementation, a computer that is provided in the vehicle uses images captured by an imaging system in the UAV together with images captured by an imaging system in the vehicle, to modify a suspension system of the vehicle based on a nature of the terrain located below, or ahead, of the vehicle. The computer may, for example, modify a suspension system before the vehicle reaches a rock or a pothole on the ground ahead. In another exemplary implementation, the computer may generate an augmented reality image that includes a 3D model of the vehicle rendered on an image of a terrain located below, or ahead of, the vehicle. The augmented reality image may be used by a driver of the vehicle to drive the vehicle over such terrain.

15 Claims, 4 Drawing Sheets (56) References Cited

U.S. PATENT DOCUMENTS

| | | | | |
|---|---|---|---|---|
| 2016/0016663 A1* | 1/2016 | Stanek | ................. | G05D 1/0202 |
| | | | | 701/3 |
| 2018/0079272 A1* | 3/2018 | Aikin | ................. | B60G 17/0195 |
| 2019/0088142 A1* | 3/2019 | Kotteri | ................. | B60W 30/165 |
| 2020/0213578 A1* | 7/2020 | Holzer | ................. | G06F 3/0488 |
| 2021/0402942 A1* | 12/2021 | Torabi | ................. | B60W 50/14 |
| 2021/0406560 A1* | 12/2021 | Park | ................. | G06V 10/82 |
| 2021/0406679 A1* | 12/2021 | Wen | ................. | G06V 20/56 |

FOREIGN PATENT DOCUMENTS

| | | | | | |
|---|---|---|---|---|---|
| GB | 2548369 | A | | 9/2017 | |
| JP | 2006180326 | A | | 7/2006 | |
| JP | 6037600 | B2 | * | 12/2016 | ............. A63H 27/12 |

\* cited by examiner

COLLABORATIVE RELATIONSHIP BETWEEN A VEHICLE AND A UAV

FIELD OF THE DISCLOSURE

This disclosure generally relates to vehicles, and more particularly relates to systems and methods related to collaborative activities between a vehicle and an unmanned aerial vehicle (UAV).

BACKGROUND

Unmanned aerial vehicles, which are popularly referred to as drones, have been used by the military for several years. Drones are now being used extensively in a wide variety of civilian applications such as delivering various articles, inspecting sites and structures after a natural disaster, photography, and videography. Aerial photography and videography can provide valuable information that may not be readily acquired through ground-based imaging systems. However, ground-based imaging systems can provide certain benefits that may not necessarily conflict with those offered by aerial imaging systems.

For example, a camera system provided in a vehicle may be used for various purposes such as to assist a driver to watch out for objects and people around the vehicle when parking the vehicle and/or when the vehicle is being driven on a road. When driving on a road, the driver may use the camera system to watch out for other vehicles behind his/her vehicle, or on either side of his/her vehicle. The driver generally relies on his/her own vision for observing vehicles traveling in front of his/her vehicle.

However, in some cases, the driver may rely on a front-facing camera mounted on a roof, a hood, or a dashboard of the vehicle to observe vehicles traveling ahead of his/her vehicle. Typically, the field of view of such a front-facing camera is preset to a certain distance and cannot be modified by the driver. Thus, the driver may be able to use a front-facing camera having a field of view of 20 feet (for example), to observe a van that is traveling 10 feet ahead of his/her vehicle but may be unaware of a collision that has taken place 100 feet ahead of his/her vehicle. Furthermore, the field of view of such a front-facing camera may be blocked in some situations (such as by a large vehicle), or the front-facing camera may be pointing in the wrong direction (towards the sky or the ground, for example) when the vehicle travels over a bump or a steep incline on the road.

Consequently, ground-based imaging systems, such as the front-facing camera described above, may be unsuitable or inadequate for use in certain situations such as, for example, when a vehicle is being driven off-road. The nature and characteristics of various objects such as bushes, trees, boulders, and rocks, may not only hinder the camera mounted in the vehicle from obtaining a good field of view of the terrain in front of the vehicle but may also cause damage to an underside of the vehicle if undetected by the driver.

It is therefore desirable to provide solutions that address at least some of the shortcomings associated with ground-based imaging systems, and particularly with ground-based imaging systems mounted in vehicles.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods pertaining to interactions between a vehicle and an unmanned aerial vehicle (UAV) for various purposes. In one exemplary implementation in accordance with the disclosure, a computer that is provided in the vehicle may use images captured by an imaging system in the UAV along with images captured by an imaging system in the vehicle, to modify a suspension system of the vehicle in accordance with a terrain located below, or ahead of, the vehicle. For example, the computer may modify the suspension system before the vehicle reaches, and travels over, a rock or a pothole on the ground. In another exemplary implementation in accordance with the disclosure, the computer may generate an augmented reality image that includes a 3D model of the vehicle rendered on an image of a terrain located below, or ahead of, the vehicle. The augmented reality image may be used by a driver of the vehicle to navigate the vehicle over various objects on the ground and/or to circumnavigate some obstacles located ahead of the vehicle.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the words "vehicle" as used in this disclosure can represent a wide variety of vehicles such as, for example, cars, vans, sports utility vehicles, trucks, electric vehicles, gasoline vehicles, hybrid vehicles, autonomous vehicles, civilian vehicles, and military vehicles. The phrase "imaging system" as used herein refers to various types of image capture devices that may be mounted upon, attached to, or transported in a vehicle and/or an unmanned aerial vehicle (UAV) for capturing various types of images. The word "image" as used in this disclosure can refer to a single image in one exemplary case, a set of images in another exemplary case, and a video clip in yet another exemplary case. All these variants are encompassed by the word "image." Furthermore, an image can be any of various types of images such as, for example, a black-and-white image, a color image, a 3-dimensional (3D) image, or an infrared image. It should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Figure 1:
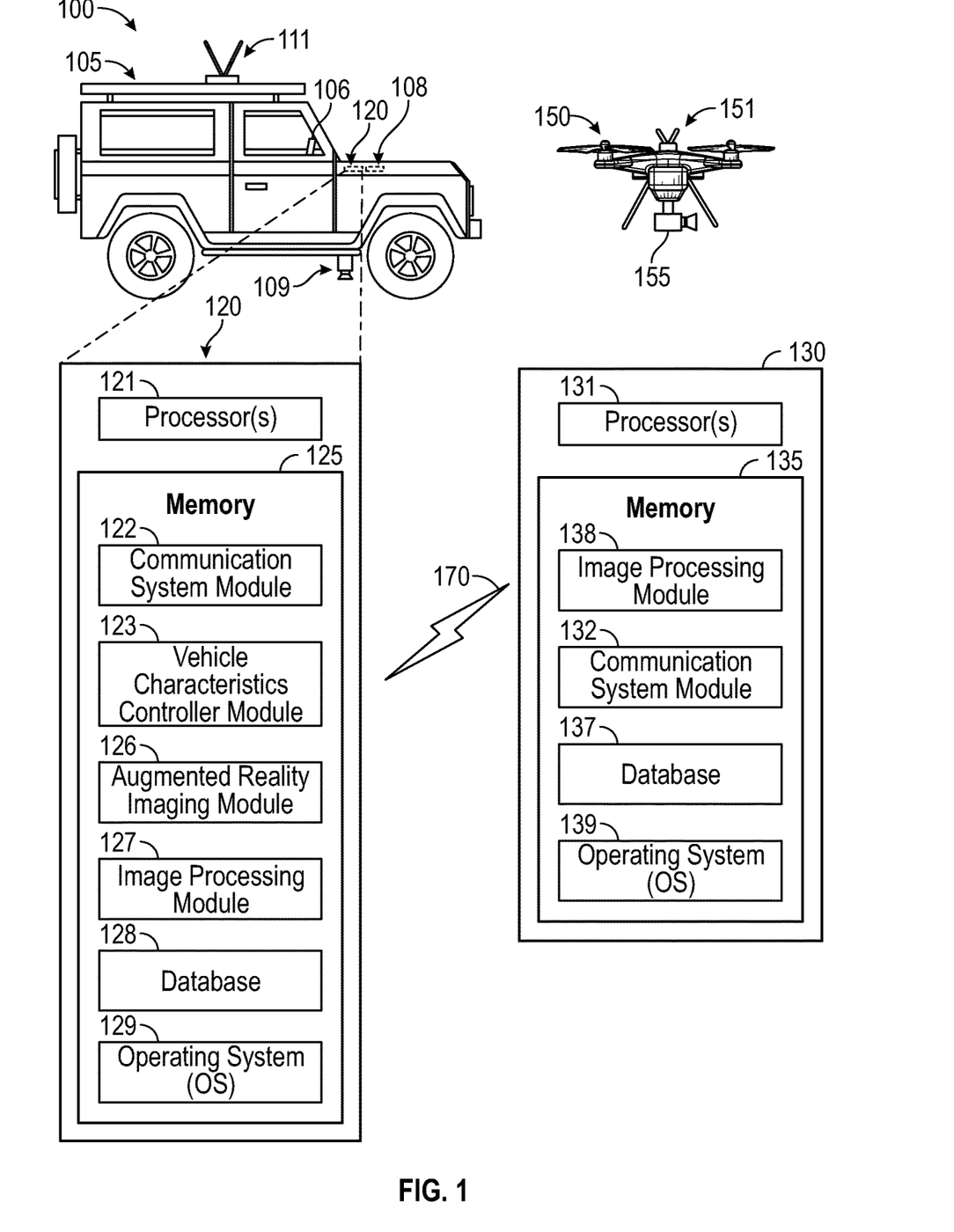
FIG. 1 shows an exemplary system that illustrates a collaborative relationship between a vehicle and an unmanned aerial vehicle (UAV) in accordance with an exemplary embodiment of the disclosure.

FIG. 1 shows an exemplary system 100 that illustrates a collaborative relationship between a vehicle 105 and an unmanned aerial vehicle (UAV) 150 in accordance with an embodiment of the disclosure. The vehicle 105 can include a system computer 120, a vehicle computer 108, a communication system 111, an infotainment system 106, and an imaging system 109. The vehicle 105 can be any of various types of vehicles such as, for example, a car that can be used for driving on a road or a sport utility vehicle (SUV) that may be used for off-road activities. The UAV 150 can include a communication system 151, a computer 130, and an imaging system 155.

In one exemplary implementation in accordance with the disclosure, the UAV 150 may fly ahead of the vehicle 105 and capture images of a ground surface located ahead of the vehicle 105, such as, for example, a stretch of a highway or a rock-strewn off-road area. The UAV 150 may use the communication system 151 to wirelessly transmit the captured images via a wireless communication link 170 to the communication system 111 provided in the vehicle 105. In another exemplary implementation in accordance with the disclosure, the UAV 150 may be tethered to the vehicle 105 and operate in a tethered mode of flight. The UAV 150 may fly ahead of the vehicle 105 in the tethered mode of flight and capture images of a ground surface located ahead of the vehicle 105. In this implementation, the UAV 150 may use the communication system 151 to propagate the captured images to the communication system 111 via a tethering cable that includes a wired communication link. In one or both implementations, the communication system 151 of the UAV 150 may communicate with the communication system 111 provided in the vehicle 105 by using various types of communication formats.

The system computer 120 may utilize the images received from the UAV 150 for various operations in accordance with the disclosure. In some operations, the system computer 120 may combine information obtained from images received from the UAV 150 with information obtained from images captured by the imaging system 109 provided in the vehicle 105. The images captured by the imaging system 109 can include one or more images of the ground surface below the vehicle 105 and/or of objects located near the vehicle 105.

The system computer 120 may include several components such as a processor 121 and a memory 125. The memory 125, which is one example of a non-transitory computer-readable medium, may be used to store an operating system (OS) 129, a database 128, and various code modules such as a communication system module 122, a vehicle characteristics controller module 123, an augmented reality imaging module 126, and an image processing module 127.

The database 128 may be used, for example, to stored images captured by the imaging system 109 of the vehicle 105 and/or images received by the communication system 111 from the communication system 151 of the UAV 150.

The communication system module 122 may be executed by the processor 121 for transfer of images and other data, from and to, the communications system 111.

The vehicle characteristics controller module 123 may be executed by the processor 121 for communicating with various types of hardware provided in the vehicle 105 for carrying out various operations in accordance with the disclosure. A few examples of such hardware may include the vehicle computer 108, a suspension system of the vehicle 105, and a sensor system provided in the vehicle 105. In one exemplary implementation in accordance with the disclosure, the vehicle characteristics controller module 123 may provide commands to the suspension system of the vehicle 105 (either directly or through the vehicle computer 108) to modify a stiffness of the suspension in preparation of the vehicle 105 traveling over a rocky terrain ahead of the vehicle 105. The rocky terrain is one example of a terrain feature that may be identifiable by the processor 121 by processing an image (or images or a video clip) received from the UAV 150 and/or an image received from the imaging system 109. The processor 121 may execute the image processing module 127 for identifying the terrain feature in the image.

The processor 121 may execute the augmented reality imaging module 126 for generating an augmented reality image that can be displayed on the infotainment system 106 of the vehicle 105. In one exemplary implementation in accordance with the disclosure, which may be referred to as "vehicle spotting," the augmented reality image can include a contour of a part of the vehicle 105 and/or a 3D model of the vehicle 105, rendered upon an image of a terrain located beneath the vehicle 105. The augmented reality image may be used by a driver of the vehicle to navigate the vehicle 105 over various objects such as rocks and bushes located beneath the vehicle. In another exemplary implementation in accordance with the disclosure, which may be referred to as "surface preview," the augmented reality image can include a contour and/or a 3D model of the vehicle 105 rendered on an image of a terrain located below the vehicle 105. The image of a terrain located below the vehicle may be aligned with, and displayed along with, another image of a terrain located ahead of the vehicle 105. This augmented reality image may be used by a driver of the vehicle to preview a ground surface ahead of the vehicle 105 such as, for example, a paved road surface or an off-road terrain. The surface preview would permit the driver to circumnavigate various obstacles such as other vehicles, rocks, and trees that may be present in front of the vehicle 105.

The computer 130 that is provided in the UAV 150 may include several components such as a processor 131 and a memory 135. The memory 135, which is another example of a non-transitory computer-readable medium, may be used to store an operating system (OS) 139, a database 137, and various code modules such as an image processing module 138 and a communication system module 132. Some of the code modules may be configured to cooperate with various types of hardware provided in the unmanned aerial vehicle 150 for carrying out various operations. For example, the processor 131 may execute the image processing module 138 for processing images captured by the imaging system 155 prior to propagating the images to the system computer 120 in the vehicle 105. In one exemplary implementation in accordance with the invention, the image processing module 138 may modify a format, or any other characteristic, of an image captured by the imaging system 155. The communications system module 132 may cooperate with the communication system 151 to transmit the modified image to the system computer 120 in the vehicle 105. In another exemplary implementation in accordance with the invention, the image processing module 138 may generate a topographic representation of an image captured by the imaging system 155. The communications system module 132 may cooperate with the communication system 151 to transmit the topographic representation to the system computer 120 in the vehicle 105.

Figure 2:
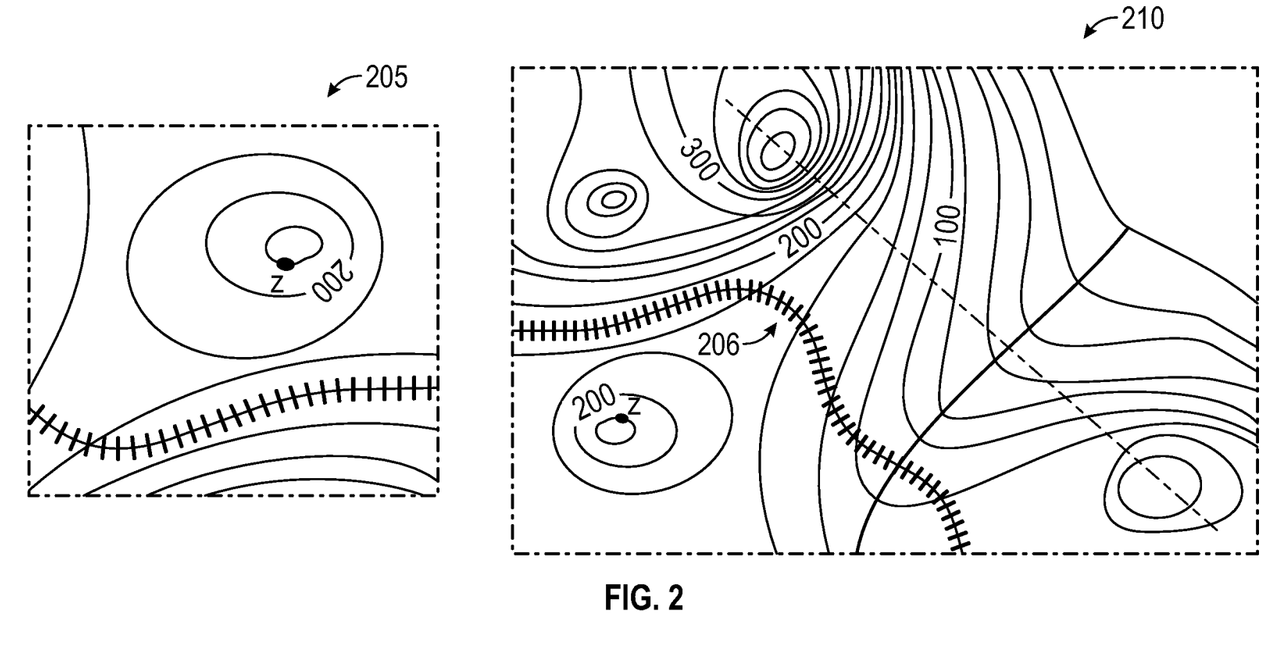
FIG. 2 illustrates two exemplary topographic images that may be used by a computer in a vehicle in accordance with some embodiments of the disclosure.

FIG. 2 illustrates two exemplary topographic images that may be generated and used by the system computer 120 in the vehicle 105 to execute various operations in accordance with some embodiments of the disclosure. Various other types of images (raw images, compressed images, digitized images, color images, black-and-white images, video clips, etc.) may be used in other exemplary embodiments. The processing and use of such other types of images may be understood from the description provided below with respect to the topographic images.

The two exemplary topographic images shown in FIG. 2 include a topographic representation 205 of an image captured by the imaging system 109 and a topographic representation 210 of an image captured by the imaging system 155. The topographic representation 205 may be generated by the processor 121 executing the image processing module 127 in the system computer 120 of the vehicle 105. The generation procedure may include the system computer 120 receiving a raw image (or a video clip) from the imaging system 109 and executing the image processing module 127 to process the raw image. The image processing module 127 may process the raw image to identify various natural topographic features such as, for example, a depression, a pit, a slope, a boulder, a hillock, a dune, gravel, sand, and/or water. The image processing module 127 may also process the raw image to identify various man-made topographic features when present, such as, for example, a road surface, a painted line on a road surface, a railway track 206, and/or a concrete structure. The natural topographic features and/or man-made topographic features can provide terrain information of a ground surface below the vehicle 105 as well as along, ahead, and/or around, a travel path of the vehicle 105.

In one exemplary implementation, the raw image provided to the system computer 120 may be captured by the imaging system 109 when the vehicle 105 is in motion and may include a section of a ground surface beneath a chassis of the vehicle 105. The raw image may further include a section of a ground surface ahead of the vehicle 105. In another exemplary implementation, the raw image captured by the imaging system 109 may include a section of a ground surface ahead of the vehicle 105 and one or more sides of the vehicle 105.

The topographic representation 210 may be generated by the processor 131 executing the image processing module 138 in the computer 130 of the UAV 150. The generation procedure may include the computer 130 receiving a raw image (or a video clip) from the imaging system 155 and executing the image processing module 138 to process the raw image. The image processing module 138 may process the raw image and identify various natural topographic features such as, for example, a hill, a depression, a boulder, a hillock, a dune, a gravel pit, and/or a stream. The image processing module 138 may also process the raw image to identify man-made topographic features when present, such as, for example, a road, the railway track 206, and/or a building. The natural topographic features and/or man-made topographic features can provide some terrain information along, ahead, and/or around, an expected travel path of the vehicle 105.

In one exemplary implementation, the raw image may be captured by the imaging system 155 of the UAV 150 when the UAV 150 is flying ahead of the vehicle 105 along the expected travel path of the vehicle 105. The raw image can provide information about the terrain ahead of the vehicle 105, so that the system computer 120 can use the information to modify the travel route of the vehicle 105 for circumnavigating a pit or a boulder, for example. In accordance with various embodiments of the disclosure, the coverage area of the raw image captured by the imaging system 155 can be larger than the coverage area of the raw image captured by the imaging system 109 of the vehicle 105. The macroscopic view offered by the raw image captured by the imaging system 155 of the UAV 150 may provide information that can be used by the system computer 120 in the vehicle 105 to identify an alternative path of travel. The alternative path of travel may be desired for one or more reasons such as for circumnavigating obstacles or for determining a more optimal travel path for the vehicle 105.

In an exemplary embodiment in accordance with the disclosure, the raw image captured by the imaging system 155 of the UAV 150 includes at least one feature such as a natural object (a hill, a pit, a stream, etc.) or a man-made object (a road, a railway track 206, or a building) that is also included in the raw image captured by the imaging system 155 of the vehicle 105. The system computer 120 in the vehicle 105 may utilize such features that may be present in both images for spatially aligning the topographic representation 205 with the topographic representation 210. The spatially aligned topographic representation may be used by the system computer 120 for various purposes, such as to issue commands to a suspension system controller to modify a stiffness of the suspension of the vehicle 105 in preparation of the vehicle 105 traveling over a rocky terrain ahead, and/or to display an augmented reality image upon the infotainment system 106 of the vehicle 105 for viewing by a driver of the vehicle 105.

Figure 3:
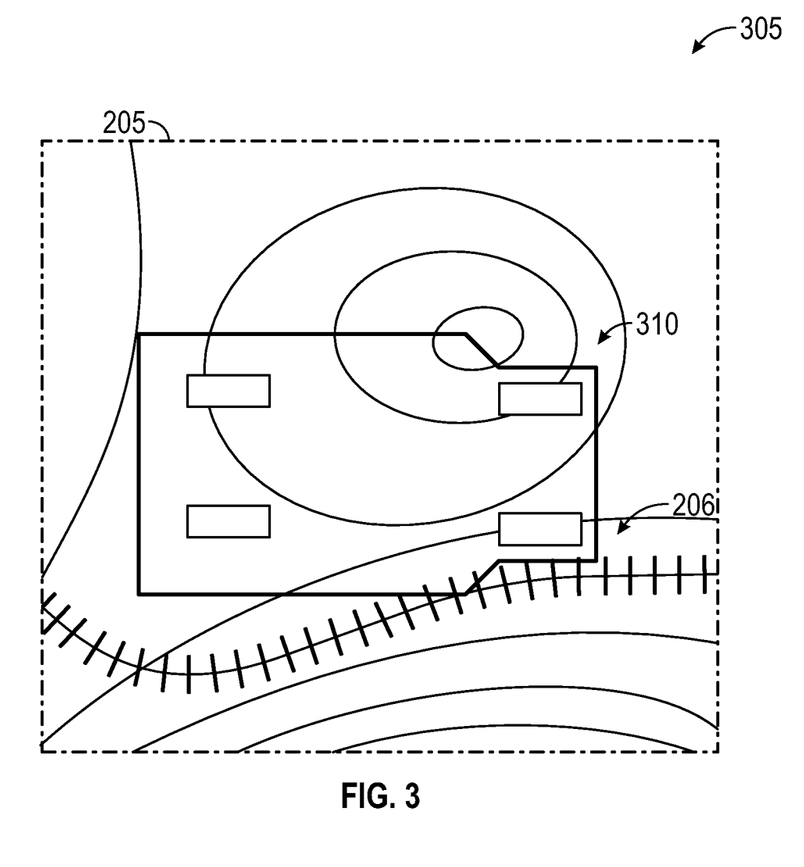
FIG. 3 shows an exemplary augmented reality image generated by a computer provided in a vehicle, in accordance with an exemplary embodiment of the disclosure.

FIG. 3 shows an exemplary augmented reality image 305 generated by the system computer 120 from a raw image captured by the imaging system 109 when the vehicle 105 is in motion. In some implementations, a set of images or a video clip may be used in place of a single image, and the augmented reality image 305 illustrated in FIG. 3 can be one among a number of images (or a video clip) that is generated by the system computer 120 in accordance with the disclosure. The exemplary augmented reality image 305 may be displayed on the infotainment system 106 and may be used to assist a driver obtain information about terrain of the ground surface below the vehicle 105 when the vehicle is in motion (or when stopped). Terrain information may be particularly useful when the vehicle 105 is being driven off-road.

In this exemplary embodiment, the augmented reality image 305 can include a combination of the topographic representation 205 described above with reference to FIG. 2 and a contour 310 of a part of the vehicle 105. In another exemplary embodiment, the augmented reality image 305 can include a raw image captured by the imaging system 109 of the vehicle 105 and a contour 310 of a part of the vehicle 105.

The contour 310 may be generated by the system computer 120 based on a 3-dimensional (3-D) model of the vehicle 105. The 3-D model may be stored in the database 128 of the system computer 120 or may be obtained from a server computer (not shown) and/or cloud storage (not shown). In one exemplary implementation in accordance with the disclosure, the system computer 120 may use the augmented reality imaging module 126 to execute an image generation procedure for generating the augmented reality image 305. The image generation procedure may include an operation executed by the processor 121 to combine the contour 310 with a topographic representation 205 that is a rendering of the terrain below the vehicle 105. In the exemplary implementation illustrated in FIG. 3, the contour 310 includes a contour of a chassis of the vehicle 105 and a contour of each of the four wheels of the vehicle 105. In other implementations, the vehicle 105 or parts of the vehicle 105 can be rendered in various other ways. For example, a semi-transparent image of the entire vehicle 105 or a part of the vehicle 105 may be superimposed upon a raw image of the terrain below and/or around the vehicle 105 that is captured by the imaging system 109. The semi-transparent image and the raw image can be updated periodically or continuously as the vehicle 105 moves from one location to another.

The image generation procedure for generating the contour 310 may be carried out by obtaining vehicle data (such as dimensions, shape, geometry, and other specifications) from the database 128 and/or other sources. The contour 310 may be rendered on a scale that matches the dimensions of one or more objects that may be present in the first raw image captured by the imaging system 109 of the vehicle 105. For example, the one or more dimensions of vehicle 105 (such as a width of the vehicle 105, for example) may be scaled to match the width of the railway track 206 or any other such object whose dimensions are well known. Scaling the contour 310 accurately can allow the driver to see and utilize the augmented reality image 305 in a meaningful way when the augmented reality image 305 is displayed on the infotainment system 106. The procedure for combining the contour 310 with the topographic representation 205 may further involve determining an angular orientation of a chassis of the vehicle 105 with respect to ground, and an angle of one or more of the wheels of the vehicle 105 with respect to the chassis of the vehicle 105. Various attributes of the chassis such as roll and pitch may also be determined and used for generating the contour 310 and for placing the contour in the augmented reality image 305.

A driver of the vehicle 105 can view the augmented reality image 305 and identify a position of one or more wheels of the vehicle with respect to various elements in the ground surface beneath the vehicle 105. For example, the driver may recognize that the passenger side front wheel of the vehicle 105 is located close to the railway track 206, and that the driver side front wheel of the vehicle 105 is on a raised portion of the ground. The driver may then drive the vehicle 105 in a manner that avoids climbing up on to the railway track 206 and/or avoids the raised portion of the ground.

The system computer 120 may also use information that is used for generating the augmented reality image 305 to instruct the vehicle characteristics controller module 123 to provide commands to the suspension system of the vehicle 105. The commands may be executed either by actuators that are directly controlled via commands issued by the system computer 120 or via commands issued by the vehicle computer 108. The actuators may respond to such commands by modifying, for example, a stiffness of the suspension in preparation of the vehicle 105 traveling over a rocky terrain ahead of the vehicle 105.

Figure 4:
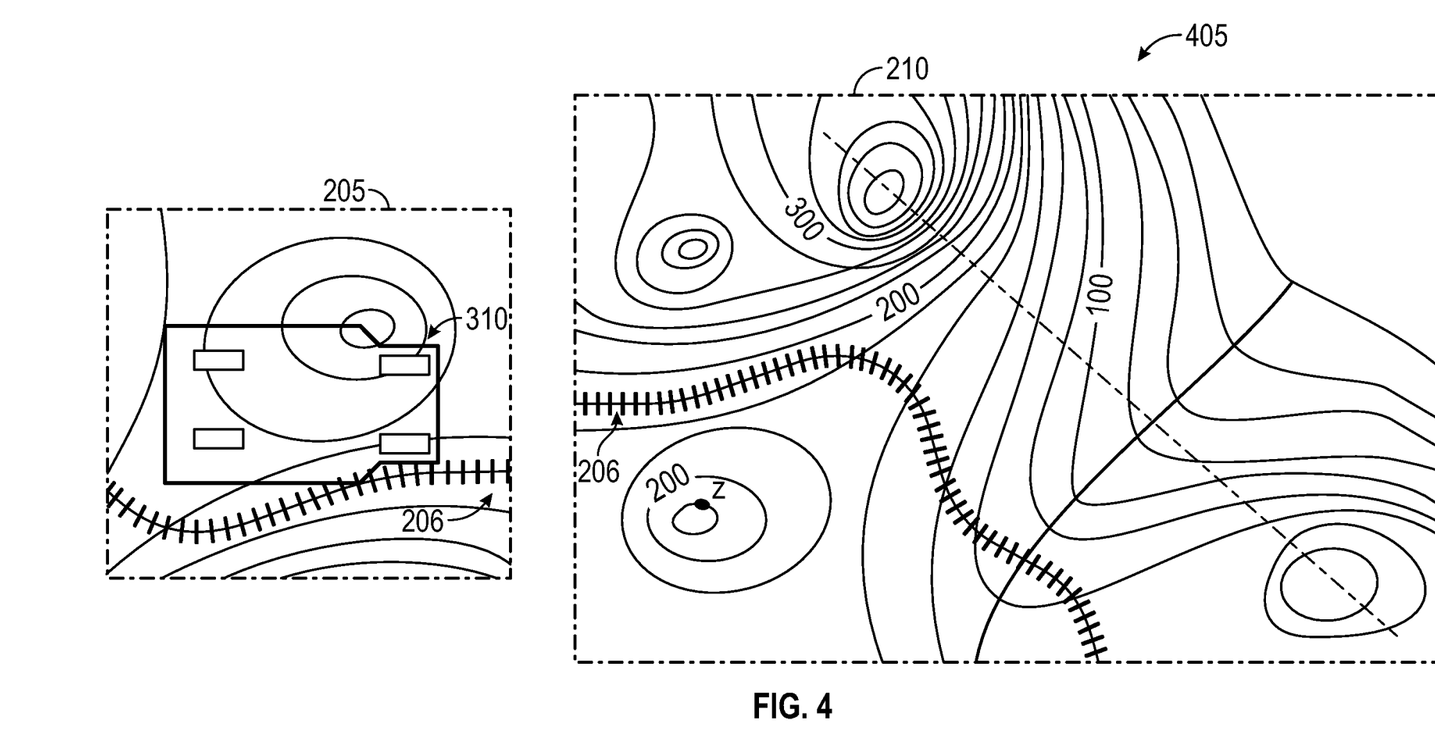
FIG. 4 shows another exemplary augmented reality image generated by a computer provided in a vehicle, in accordance with an exemplary embodiment of the disclosure.

FIG. 4 shows an exemplary augmented reality image 405 generated by the system computer 120 from a first raw image captured by the imaging system 109 when the vehicle 105 is in motion and a second raw image captured by the imaging system 155 of the UAV 150 flying ahead of the vehicle 105. In some implementations, a set of images or a video clip may be used in place of the first raw image and/or the second raw image, and the augmented reality image 305 illustrated in FIG. 4 can be one image among a number of images (or a video clip) generated by the system computer 120 in accordance with the disclosure.

The exemplary augmented reality image 405 may be displayed on the infotainment system 106 to assist a driver obtain information about terrain of the ground surface below the vehicle 105 as well as ahead of the vehicle 105. Terrain information may be particularly useful when the vehicle 105 is being driven off-road because the driver can carry out some pre-emptive operations based on a nature of the terrain and objects located ahead of the vehicle 105.

In this exemplary embodiment, the augmented reality image 405 can include the contour 310 overlaid upon, or blended with, the topographic representation 205 and the topographic representation 210 described above. In another exemplary embodiment, the augmented reality image 305 can include the contour 310 overlaid upon, or blended with, a combination of a raw image captured by the imaging system 109 of the vehicle and a raw image captured by the imaging system 155 of the UAV 150.

In one exemplary implementation in accordance with the disclosure, the system computer 120 may use the augmented reality imaging module 126 to execute an image generation procedure for generating the augmented reality image 405. The image generation procedure may include a first operation to spatially align the contour 310 with respect to the topographic representation 205 and a second operation to spatially align the topographic representation 205 with the topographic representation 210. The two operations may be carried out in any suitable sequence or may be carried out concurrently.

The first operation may be carried out by obtaining vehicle data (such as dimensions, shape, geometry, and other specifications) from the database 128 and/or other sources. The vehicle data may be used to generate a contour of a part of the vehicle 105 such as the contour 310 described above.

The contour 310 may be drawn to a scale that matches the dimensions of one or more objects that may be present in the first raw image captured by the imaging system 109 of the vehicle 105. For example, the one or more dimensions of vehicle 105 (such as a width of the vehicle 105, for example) may be scaled to match the width of the railway track 206 or any other such object whose dimensions are well known. Scaling the contour 310 accurately can allow the driver to see and utilize the augmented reality image 405 in a meaningful way when the augmented reality image 405 is displayed on the infotainment system 106.

The second operation may be carried out, for example, by identifying one or more features that may be present in a raw image captured by the imaging system 155 of the UAV 150 as well as in a raw image captured by the imaging system 109 of the vehicle 105. Such features that are present in both raw images may be readily found when the raw image captured by the imaging system 155 of the UAV 150 encompasses at least a portion of the image content present in the raw image captured by the imaging system 109 of the vehicle 105. One example of a common feature is the railway track 206 that may be present in the raw image captured by the imaging system 155 of the UAV 150 (and used to generate the topographic representation 205) as well as in the raw image captured by the imaging system 109 of the vehicle 105 (and used to generate the topographic representation 210).

In this example, the railway track 206 may be used to spatially align the raw image captured by the imaging system 155 with the raw image captured by the imaging system 109, after carrying out any adjustments that may be needed for various parameters such as size, scale, orientation, linearity, image resolution, and color characteristics, and linearity of one or both images. The topographic representation 205 and the topographic representation 210 may then be generated and spatially aligned with each other using the railway track 206 and/or other natural features (such as the contours of the terrain, for example) and man-made elements (such as a building, for example). Spatially aligning the topographic representation 205 with the topographic representation 210 can allow the driver to utilize the augmented reality image 405 for identifying objects located underneath the vehicle 105 and/or ahead of the vehicle 105.

In other implementations, the vehicle 105 or parts of the vehicle 105 can be rendered upon the topographic representation 205. For example, a semi-transparent image of the entire vehicle 105 or a part of the vehicle 105 may be superimposed upon a raw image captured by the imaging system 109 of the vehicle 105. The semi-transparent image and the raw image can be updated periodically or continuously as the vehicle 105 moves from one location to another. If so desired by the driver, the semi-transparent image of the entire vehicle 105 (or a part of the vehicle 105) may be superimposed upon a raw image captured by the imaging system 155 of the UAV 150 so as to simulate an expected driving condition when, and if, the vehicle 105 takes a travel path over the terrain depicted in the raw image captured by the imaging system 155. The semi-transparent image and the raw image can be updated continuously as a part of the simulation.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 125 and the memory 135, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    receiving, by a computer of a vehicle and from an unmanned aerial vehicle (UAV) in communication with the vehicle, at least a first image of a first section of a ground surface;
    capturing, by an imaging system of the vehicle, at least a second image of a second section of the ground surface located below the vehicle, the second image including at least a part of the first section of the ground surface;
    generating, by the computer and based on the first image and the second image, terrain information of the ground surface;
    modifying, by the computer and based the terrain information, at least one driving characteristic of the vehicle;
    spatially matching the first image to the second image by identifying at least a first topographic feature that is present in each of the first image and the second image;
    generating a first topographic representation of the first image and a second topographic representation of the second image, wherein the first topographic representation includes the first topographical feature and the second topographic representation includes the first topographical feature;
    spatially aligning the first topographic representation of the first image with the second topographic representation of the second image based on a location of the first topographic feature in the first topographic representation and a location of the first topographic feature in the second topographic representation;
    determining, by the computer located in the vehicle, at least one of an angular orientation of a chassis of the vehicle with respect to the ground surface and an angle of a wheel of the vehicle with respect to the chassis of the vehicle;
    generating, based on spatially aligning the first topographic representation to the second topographic representation and by the computer located in the vehicle, an augmented reality image that combines a contour of a part of the vehicle and a rendering of a terrain area below the vehicle including a combined topographic representation based on the first topographic representation and the second topographic representation; and
    displaying the augmented reality image on a display of an infotainment system in the vehicle, wherein the contour of the part of the vehicle is a semi-transparent top-down representation of the vehicle that includes an outline of a chassis of the vehicle and wheels of the vehicle, and wherein a portion of the rendering of the terrain located behind the contour in the augmented reality image is visible through the contour.

2. The method of claim 1, wherein utilizing the terrain information to modify at least one driving characteristic of the vehicle comprises modifying a functional characteristic of a suspension system of the vehicle.

3. The method of claim 1, wherein the ground surface is one of: a part of an off-road area or a part of a paved road.

4. The method of claim 1, wherein generating the augmented reality image comprises:
determining, by the computer located in the vehicle, a disposition of one or more components of the vehicle.

5. The method of claim 4, wherein the disposition of one or more components of the vehicle includes an angular orientation of a chassis of the vehicle with respect to the ground surface, and an angle of a wheel of the vehicle with respect to the chassis of the vehicle.

6. A vehicle comprising:
an imaging system; and
a computer comprising:
at least one memory that stores computer-executable instructions; and
at least one processor configured to access the at least one memory and execute the computer-executable instructions to at least:
receive, from an unmanned aerial vehicle (UAV) in communication with the vehicle, at least a first image of a first section of a ground surface;
capture, by the imaging system, at least a second image of a second section of the ground surface located below the vehicle, the second image including at least a part of the first section of the ground surface;
spatially match the first image to the second image by identifying at least a first topographic feature that is present in each of the first image and the second image;
generating a first topographic representation of the first image and a second topographic representation of the second image, wherein the first topographic representation includes the first topographical feature and the second topographic representation includes the first topographical feature;
spatially align the first topographic representation of the first image with the second topographic representation of the second image based on a location of the first topographic feature in the first topographic representation and a location of the first topographic feature in the second topographic representation;
generate terrain information of the ground surface by processing the first image and the second image;
utilize the terrain information to modify at least one driving characteristic of the vehicle;
determine, by the computer located in the vehicle, at least one of an angular orientation of a chassis of the vehicle with respect to the ground surface and an angle of a wheel of the vehicle with respect to the chassis of the vehicle;
generate, based on spatially aligning the first topographic representation to the second topographic representation and by the computer located in the vehicle, an augmented reality image that combines a contour of a part of the vehicle and a rendering of a terrain area below the vehicle including a combined topographic representation based on the first topographic representation and the second topographic representation; and
display the augmented reality image on a display of an infotainment system in the vehicle, wherein the contour of the part of the vehicle is a semi-transparent p-down representation of the vehicle that includes an outline of a chassis of the vehicle and wheels of the vehicle, and wherein a portion of the rendering of the terrain located behind the contour in the augmented reality image is visible through the contour.

7. The vehicle of claim 6, wherein processing the first image and the second image for generating the terrain information comprises spatially matching the first image to the second image by identifying at least a first feature that is present in each of the first image and the second image and spatially aligning a first topographic representation in the first image to a second topographic representation in the second image.

8. The vehicle of claim 6, wherein utilizing the terrain information to modify at least one driving characteristic of the vehicle comprises modifying a functional characteristic of a suspension system of the vehicle.

9. The vehicle of claim 6, wherein the ground surface is one of: a part of an off-road area or a part of a paved road.

10. The vehicle of claim 6, wherein the at least one processor is further configured to access the at least one memory and execute additional computer-executable instructions to at least:
determine at least one of an angular orientation of a chassis of the vehicle with respect to the ground surface and an angle of a wheel of the vehicle with respect to the chassis of the vehicle for generating the augmented reality image.

11. The method of claim 1, wherein the contour of the part of the vehicle is scaled to match a dimension of one or more objects present in the first image.

12. A system comprising:
at least one memory that stores computer-executable instructions; and
at least one processor configured to access the at least one memory and execute the computer-executable instructions to at least:
receive, by a computer of a vehicle and from an unmanned aerial vehicle (UAV) in communication with the vehicle, at least a first image of a first section of a ground surface;
capture, by an imaging system of the vehicle, at least a second image of a second section of the ground surface located below the vehicle, the second image including at least a part of the first section of the ground surface;
generate, by the computer and based on the first image and the second image, terrain information of the ground surface;
modify, by the computer and based the terrain information, at least one driving characteristic of the vehicle;
spatially match the first image to the second image by identifying at least a first topographic feature that is present in each of the first image and the second image;
generate a first topographic representation of the first image and a second topographic representation of the second image, wherein the first topographic representation includes the first topographical feature and the second topographic representation includes the first topographical feature;

spatially align the first topographic representation of the first image with the second topographic representation of the second image based on a location of the first topographic feature in the first topographic representation and a location of the first topographic feature in the second topographic representation;

determine, by the computer located in the vehicle, at least one of an angular orientation of a chassis of the vehicle with respect to the ground surface and an angle of a wheel of the vehicle with respect to the chassis of the vehicle;

generate, based on spatially aligning the first topographic representation to the second topographic representation and by the computer located in the vehicle, an augmented reality image that combines a contour of a part of the vehicle and a rendering of a terrain area below the vehicle including a combined topographic representation based on the first topographic representation and the second topographic representation; and display the augmented reality image on a display of an infotainment system in the vehicle, wherein the contour of the part of the vehicle is a semi-transparent top-down representation of the vehicle that includes an outline of a chassis of the vehicle and wheels of the vehicle, and wherein a portion of the rendering of the terrain located behind the contour in the augmented reality image is visible through the contour.

13. The system of claim 12, wherein the at least one processor is further configured to execute the computer-executable instructions to:

utilize, by the computer, the terrain information to modify at least one driving characteristic of the vehicle.

14. The system of claim 13, wherein the ground surface is one of a part of an off-road area or a part of a paved road, and wherein utilizing the terrain information to modify at least one driving characteristic of the vehicle comprises modifying a functional characteristic of a suspension system of the vehicle.

15. The system of claim 13, wherein utilizing the terrain information to modify at least one driving characteristic of the vehicle comprises modifying a functional characteristic of a suspension system of the vehicle.

* * * * *